United States Patent [19]
Zhao

[11] Patent Number: 5,808,379
[45] Date of Patent: Sep. 15, 1998

[54] BI-DIRECTIONAL LINEAR DRIVE MOTOR

[75] Inventor: Wei Zhao, Horsham, Pa.

[73] Assignee: Kulicke and Soffa Industries, Inc., Willow Grove, Pa.

[21] Appl. No.: 857,446

[22] Filed: May 16, 1997

[51] Int. Cl.$^6$ .................................................. H02K 41/02
[52] U.S. Cl. ............................................. 310/12; 318/135
[58] Field of Search .................................. 310/12, 13, 14; 318/135

[56] References Cited

U.S. PATENT DOCUMENTS

| | | | |
|---|---|---|---|
| 3,421,034 | 1/1969 | Hershberger | 310/192 |
| 4,808,892 | 2/1989 | Dreibelbis | 318/135 |
| 4,990,809 | 2/1991 | Artus et al. | 310/192 |
| 5,113,099 | 5/1992 | Wong et al. | 310/13 |

Primary Examiner—Steven L. Stephan
Assistant Examiner—Judson H. Jones
Attorney, Agent, or Firm—John B. Sowell-ATT

[57] ABSTRACT

The present invention comprises an improvement of a known bi-directional linear motor and is applicable to other linear motors. The linear motor comprises a plurality of pole pieces arranged as a closed frame having three horizontal pole pieces and two vertical end pieces with permanent magnets mounted therein to form a closed stator core having a symmetrical permanent magnetic flux field path in the stator. A force coil is mounted over the center pole piece of the three horizontal pole pieces. When force current is applied to the force coil a reaction flux is generated in the stator core which creates an unbalanced flux field in the stator core. At least one air gap is provided in at least one of the pole pieces through which the reaction flux passes to increase the magnetic inductance which in turn increase the force on the force coil for a given force current.

17 Claims, 10 Drawing Sheets

BI-DIRECTIONAL LINEAR DRIVE MOTOR

BACKGROUND OF THE INVENTION

1. Field of the Invention

The present invention relates to bi-directional drive motors having a force coil capable of movement in two orthogonal directions. More particularly, the present invention relates to an improved bi-directional drive motor for positioning objects such as a load platform accurately at very high speeds and gravitational forces.

2. Description of the Prior Art

This invention is an improvement of the bi-directional drive motor and system shown and described in U.S. Pat. No. 4,808,892 which is assigned to the same assignee as the present invention. U.S. Pat. No. 4,808,892, which is incorporated herein by reference, shows and describes a system and bi-directional drive motors designed for use in automatic wire and die bonders sold by Kulicke and Soffa Industries, Inc. located in Willow Grove, Pa. 19090.

These prior art bi-directional motors were adapted to move a large mass such as a bond head and/or X-Y stage in both an X and a Y direction simultaneously.

A primary purpose of such motors in a wire bonder environment is to accurately position a bonding tool relative to a semiconductor device. In a wire bonder environment the bond head is preferably mounted on an X-Y stage and positioned twice for each interconnecting wire being bonded. Up to ten such wires may be bonded each second. Thus, the throughput of the bonder is closely related to the speed of positioning of the bonding tool. To achieve high positioning speeds, high current values are applied to the moving coils of the bi-directional motors. High currents and continuous use cause heating of the bi-direction motors as well as an increase in the impedance of the moving coils. To achieve the same or equal force additional current is needed which causes still more heat.

It is important that the bond head of a wire bonder move at optimum high speeds and rapidly reach a stable operating temperature to prevent any bonding errors which could result from temperature changes.

Accordingly, it would be desirable to provide a new and improved bi-directional drive motor which produces less heating under normal working conditions and which is capable of reaching a stable working temperature faster while producing improved efficiency of operation.

SUMMARY OF INVENTION

It is a principal object of the present invention to provide an improved bi-directional motor.

It is another principal object of the present invention to provide a modified stator for a bi-directional motor which positions a predetermined mass faster using the same current as a prior art motor of identical parameters.

It is another object of the present invention to provide a modified stator for a bi-directional motor which will position a given mass as fast as an unmodified identical prior art motor with less current and power.

It is a general object of the present invention to provide improvements in bi-directional drive motors which may be embodied into new motors or applied as a retrofit to existing motors to improve their speed and performance.

DETAILED DESCRIPTION OF THE PREFERRED EMBODIMENTS

Figure 1:
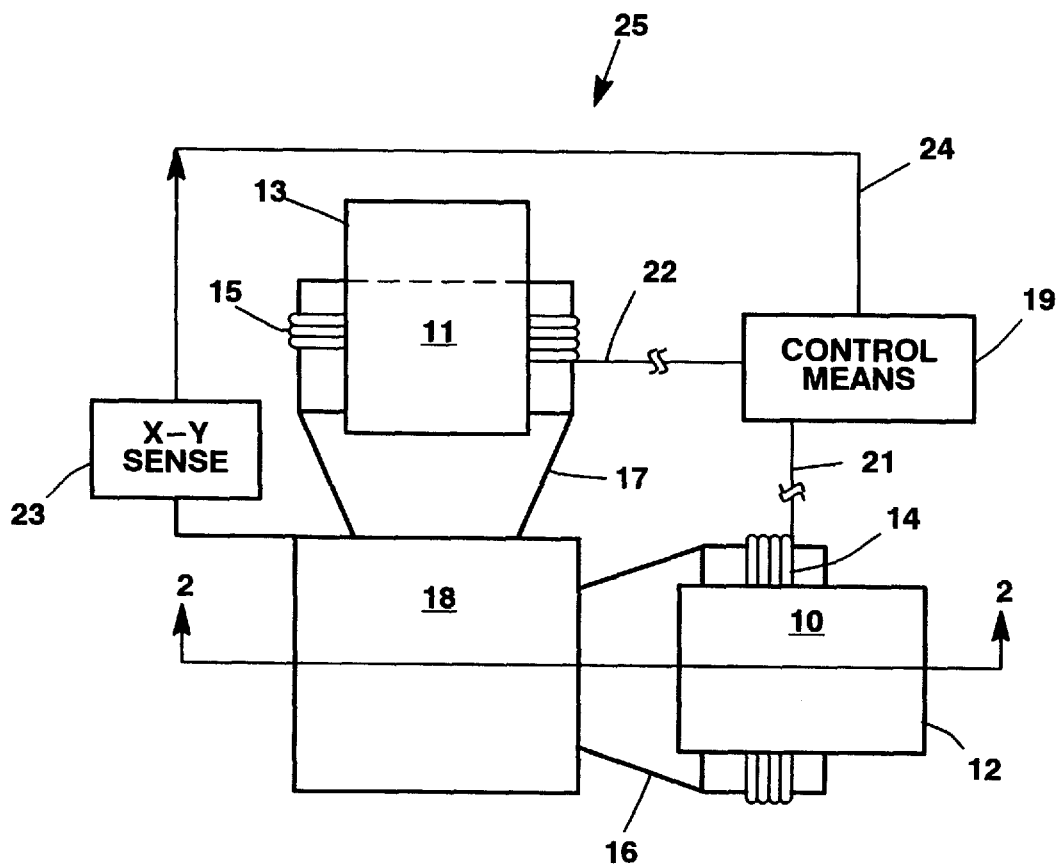
FIG. 1 is a schematic plan view of a prior art bi-directional drive motor system capable of positioning the top stage of a workstation in X, Y and θ directions.

Refer now to FIG. 1 showing a schematic plan view of a pair of bi-directional motors 10 and 11 having stators 12 and 13 and open rectangular shaped bi-directional moving coils 14 and 15. Each coil is supported on respective coil supports 16, 17 which are connected to an X or a Y stage of the X-Y table 18.

Control means 19 are coupled by flexible electrical wires 21 and 22 to coils 14 and 15 for generating a force field employed to move the X and Y stages independent of each other. In this embodiment coil 14 only exerts a force in the X direction while coil 15 only exerts a force in the Y direction. Movement of the top stage of table 18 is sensed by sensor 23 and the feedback signals on line 24 form a closed loop prior art positioning system 25.

Figure 2:
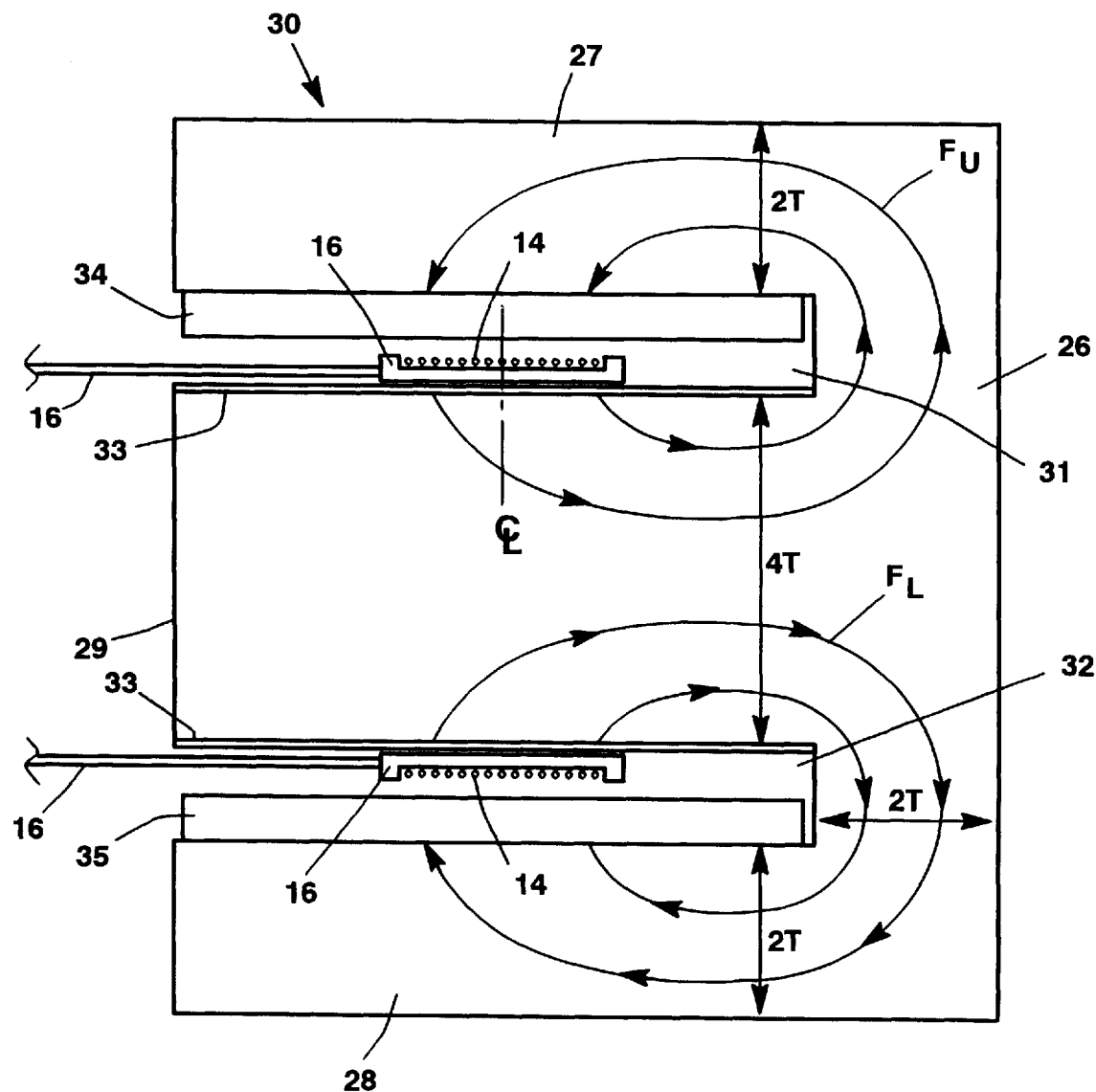
FIG. 2 is a schematic side elevation view of a prior art bi-directional drive motor showing a static flux pattern and a movable force coil in the air gap of an E-shaped open stator core.

Refer now to FIG. 2 showing a section in elevation taken through a prior art linear motor having a stator 30 arrange in the form of an open E-frame having one vertical side pole 26 and two horizontal poles 27 and 28 each having a rectangular shape in section and a thickness designated 2 T. A center horizontal pole 29 is connected to pole 26 and separated from poles 27 and 28 by air gaps 31 and 32. A short turn 33 of highly conductive material such as copper completely surrounds center pole 29. As is known in the loudspeaker art, the shorted turn decreases the voice coil time constant t where $t = L_C / R_C$ and $L_C$ and $R_C$ are the inductance and resistance of the coil. The penalty paid for the shorted turn is a small increase in the depth of the air gaps in which the coil 14 moves.

Rectangular permanent magnetics 34 and 35 are preferably placed in the air gap 31 and 32 and produce a permanent magnetic field in the stator core or pole assembly. The upper and lower field $F_U$ and $F_L$, shown schematically, pass through coil 14 to a path of least resistance which passes through pole 29 having a pole thickness of 4 T and returns through poles 26, 27, 28 forming a closed loop magnetic field.

The stationary field $F_U$ and $F_L$, shown schematically, is a result of the permanent magnets selected to generate a high density field in the magnetic material stator 30. By selecting the ratio of thicknesses 2 T and 4 T, the stationary flux density in the stator is substantially uniform.

Figure 3:
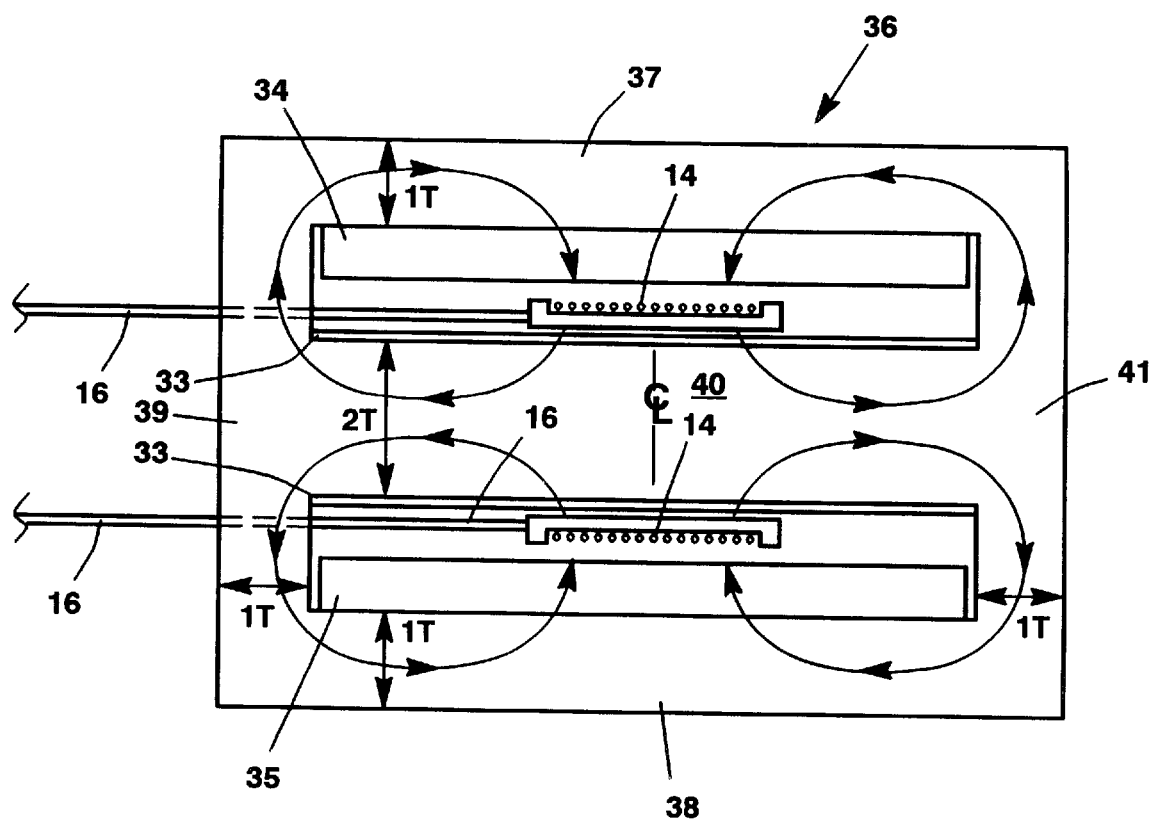
FIG. 3 is a schematic side elevation view of a prior art bi-directional drive motor showing a static flux pattern and a movable force coil in the gap of an E-I-shaped closed stator core.

Refer now to FIG. 3 showing a section in elevation taken through a prior art motor having a closed stator frame 36. The vertical pole pieces 39 and 41 as well as the upper and lower horizontal pole pieces 37 and 38 are shown having a thickness 1 T. The center pole 40 of the stator 36 has a thickness 2 T. The same strength permanent magnets 34 and 35 are placed in the same size air gaps 31 and 32, thus produce the same flux density in the pole pieces as illustrated in the FIG. 2 embodiment. The same coil 14 senses the same flux density as the FIG. 2 embodiment. Other elements in FIG. 3 which operate the same as the elements in FIG. 2 are numbered the same. Note that the split path of the permanent magnetic fields $F_U$ and $F_L$ have the same flux density as in FIG. 2 because of the reduction of the cross sectional areas of the pole pieces. The magnetic field passing through the coils 14 is the same as in FIG. 2 and the reaction force to current in the coils should be the same.

Figure 4:
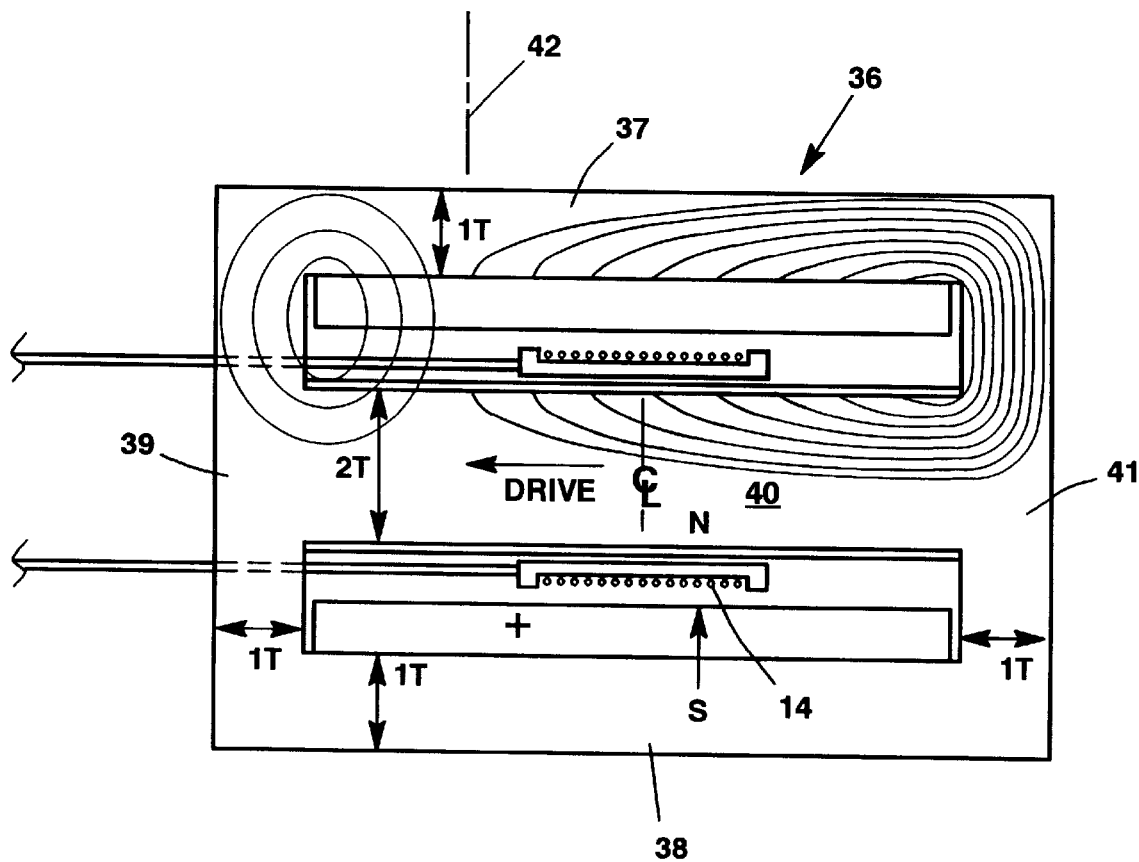
FIG. 4 is a schematic side elevation view of the prior art drive motor of FIG. 3 showing schematically the saturated magnetic flux pattern which results when reaction flux of the force coil is superimposed on the flux pattern due to the permanent magnets.

Refer now to FIG. 4 showing a schematic elevation view in partial section having a reaction force pattern superimposed on a stator core 36 as shown in FIG. 3. Current of a first polarity passing into the paper of lower coil 14 is shown by a + designation and current coming out of the upper coil thus passes out of the paper creating a driving force shown by the arrow designation. A portion of the stationary flux field at the left side of the stator 36 is canceled, however, the dynamic reaction force field created by the coil 14 adds to the stationary flux field as shown at the right side of stator 36, thus, causing the pole piece 41 to reach saturation more rapidly than other portions of the stator 36. A typical distribution approaches 15% versus 85% at saturation. When the current in coil 14 is reversed, pole piece 39 saturates more rapidly than pole piece 41 and the field density lines are reversed from right to left causing the drive force on coil 14 to reverse. It is obvious that the thickness of the pole pieces of stator 26 could be increased to accommodate the increased flux density saturation point, however, this would increase the size of the stator 36 and also increase the stator cost and weight.

One way of explaining the unbalanced saturation of the field flux due to the reaction field generated by the force coil 14 is to observe that the center line 42 between the flux fields shift from the center line of the coil 14 in the direction of the pole 39 where the permanent magnetic flux field is canceled. When this occurs, the total remaining reaction flux, as well as the permanent magnetic flux, becomes additive in pole piece 41.

Figure 5:
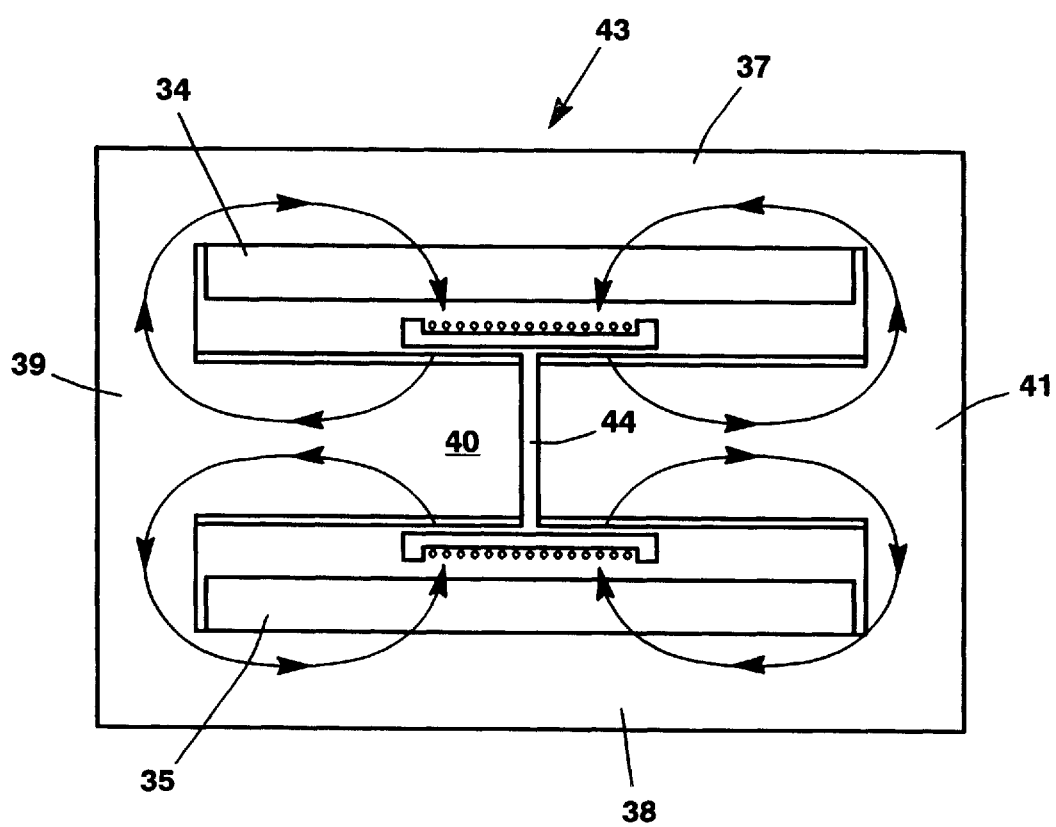
FIG. 5 is a schematic side elevation view of a first preferred embodiment bi-directional drive motor according to the present invention showing the static flux pattern before a reaction flux is generated by the force coil.

Refer now to FIG. 5 showing a schematic elevation view in partial section of the static flux density pattern produced in the present invention core assembly 43 when no drive current is applied to the force coil 14. The size and thickness of the pole pieces 36 to 40 are the same as those shown in FIGS. 3 and 4 and are numbered the same. For the purpose of comparison with the prior art stator core 36 the stator 43 size and material used for both FIGS. 4 and 5 are here assumed as being identical except for a very narrow air gap 44 in pole piece 40 measuring up to about five millimeters. It will be noted that the static flux distribution is identical to that shown in prior art FIG. 3 without an air gap 44, thus, a detailed explanation is the same as that made with reference to FIG. 3. While the static flux distribution remains the same as before there is an improvement in reaction force of almost twenty percent when operating in the dynamic state as will now be explained.

Figure 6:
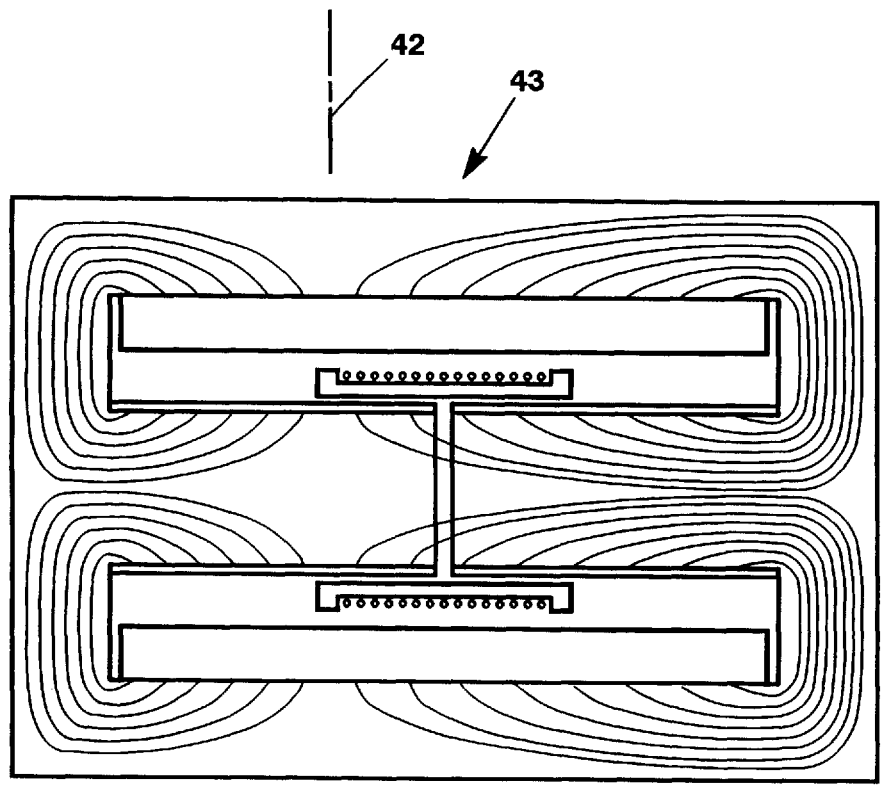
FIG. 6 is a schematic side elevation view of the bi-directional drive motor of FIG. 5 showing the dynamic flux pattern after a reaction flux of the force coil is added.

Refer now to FIG. 6 showing a schematic elevation view in partial section of the flux pattern produced in the stator core assembly 43 when a drive current of a first polarity is applied to the force coil 14. The reaction flux produced by the coil cancels part of the flux field on the left side and adds to the flux field on the right. The reaction flux field passes through the air gap 44 which results in an increase in the load impedance $Z_L$ while the coil resistance R remains the same, thus, the time constant T, which is equal to $Z_L/R$ increases, resulting in an increase in the motor frequency response bandwidth which decreases the response time.

Since the reaction flux field now passes through the air gap in a closed loop flux field path, there is a dramatic increase in magnetic impedance sensed by the current applied to coil 14. Less energy is stored in the coil due to this increase in magnetic impedance. This reduces the inductive energy (inductance) stored in the coil, thus, permitting a faster build up of drive current in the coil which results in faster force build up. A typical distribution approaches 40% versus 60% before saturation.

The benefit of obtaining higher force with less current has two benefits. Higher reaction force per unit of current applied now results in less power dissipation as well as a lower temperature rise in the stator core.

The center line of the flux field 42 shifts back to the right toward the center of the coil 14 resulting in a more even distribution of the reaction flux in the end pole pieces 39 and 41. This more even distribution of flux in the end pole pieces reduces the saturation flux density for a given drive current. Conversely, higher currents may be applied before a saturation condition occurs.

Figure 7:
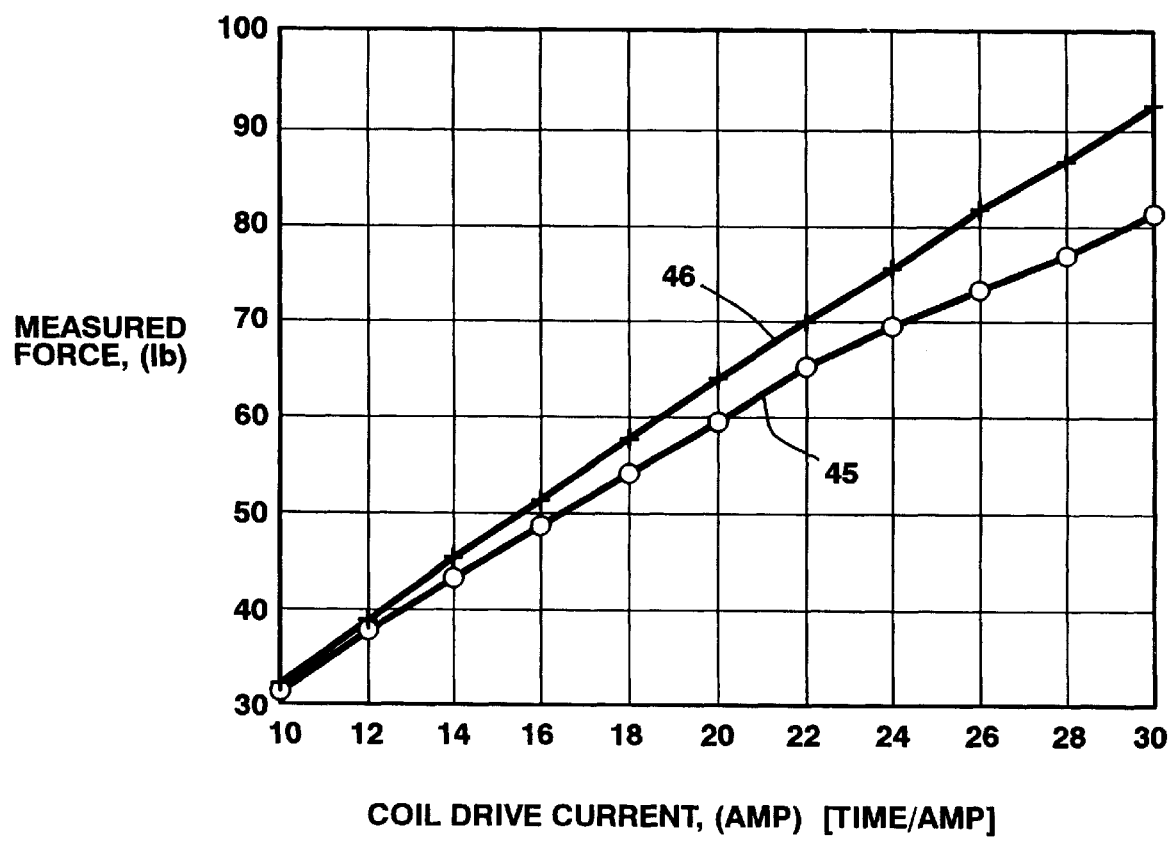
FIG. 7 is a plot of the force produced by current applied to the force coils shown in FIGS. 4 and 6 as a result of typical operating currents in the force coil showing the improved result due to the present invention.

Refer now to FIG. 7 showing a waveform plot of measured output force produced by a coil 14 versus the current applied to the coil 14. Prior art waveform 45 shows the force in pounds produced by a range of drive currents up to thirty amperes. A prior art stator 36 of the type shown in FIG. 4 was employed to record the data shown in waveform 45. In contrast thereto waveform 46 shows the force in pounds produced by the same range of drive current employing the novel stator shown in FIGS. 5 and 6. It can be seen that waveform 45 is linear up to about twenty-two amperes and produces portionally less force for a given current increase up to the maximum useful current, however, waveform 46 remains substantially linear over the entire range of operability shown. This illustrates that the effects of flux field saturation are substantially less for the present invention stator 43. The force output improvement at thirty amperes is 14% employing an air gap of approximately 4.0 millimeters. When the air gap was increased up to about 5.0 millimeters the improvement in force approaches 20%.

There is a trade off in increasing the air gap to achieve a decrease in the intensity of the reaction flux for a given current and reduced stator core saturation. As the air gap is increased, the flux distribution at the center of pole 40 become more uneven. This could result in a non-linear response. When the width of the air gap is limited to 10% or less of the movement of the moving coil 14, the uneven flux distribution causes no noticeable effect on force response.

Having explained how a greater force may be achieved with the application of a given current with reference to FIG. 7, the coil drive current (X ordinate) may be viewed as units of current applied over predetermined units of time. Thus, it will be seen from FIG. 7 that for any current applied over the same time period that the new bi-directional motor achieves a higher coil driving force for the same current or is capable of producing the same driving force in a shorter period of time. In the present comparison, force is equal to mass times acceleration and mass is unchanged in the comparison motors. Thus, acceleration is directly proportional to applied force and the speed of positioning is also increased as a result of the present invention motor.

To further increase speed of positioning applicants have reduced the mass of the coil supports 16 using graphite composites, reduced the mass of the bond head load and the X-Y stages which are part of the mass being positioned.

To further increase speed of positioning with bi-directional X-Y drive motors, the flux density in the air gaps 31, 32 may be decreased by winding the coils 14 in a single flat plane and supporting the coils on self-lubricating coil support material such as graphite composites and/or applying self-lubricating plastic wear layers such as special nylons. If the coating on the coil support is compatible with highly conductive short turn material such as gold, silver, nickel and copper the short turn layer may be made very thin and designed to contact the coil support 16.

Figure 8:
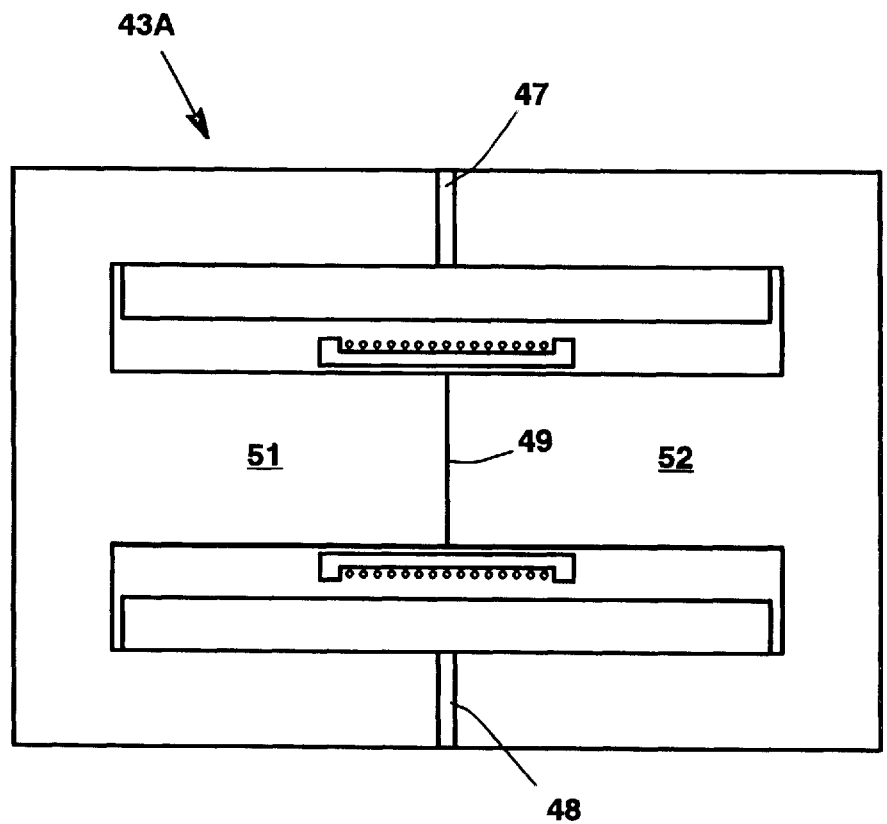
FIG. 8 is a modification of the drive motor shown in FIG. 5 and is used to illustrate alternative placement of the air gap to reduce cost of manufacture.

Refer now to FIG. 8 showing a schematic elevation view in partial section of a modified stator coil assembly 43A. In this modified embodiment the air gap 44 shown in FIGS. 5 and 6 is replaced with two air gaps 47 and 48 preferably filled with a low permeability material such as a resilient plastic. The stator is preferably made as two substantially identical E-frames 51, 52 connected to each other at a parting line 49. This modified stator 43A has a distinct advantage in its ease of manufacture. The parting line 49 serves as a stand off gage for making air gaps 47 and 48. Further, the air gaps 31 and 32 between horizontal pole pieces 37 and 40 and 38 and 40 are more accessible for precision machining. Having explained the function of parting line 49 it will be understood that similar parting lines may present in the pole pieces 37 and 38 of FIGS. 5 and 6 which will define the air gap 44 shown therein.

Figure 9:
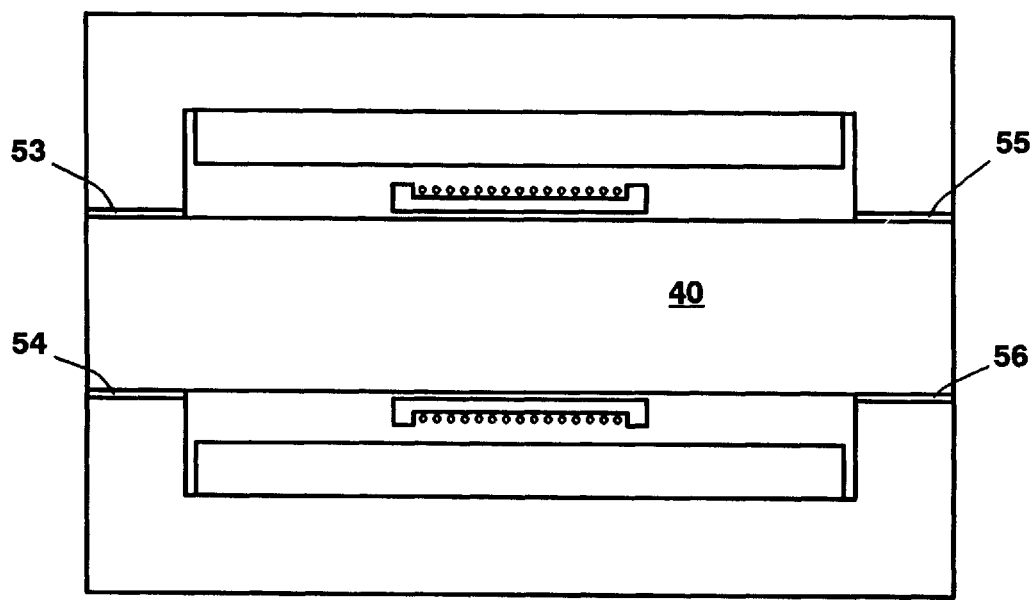
FIG. 9 is a second modification of the drive motor shown in FIG. 5 and is used to illustrate alternative placement of the air gap between pole pieces for reducing cost of manufacture.

Refer now to FIG. 9 showing a schematic elevation view in partial section of another modified stator core assembly 43B. In this modified embodiment, four horizontal air gaps 53 to 56 are shown in the vertical pole pieces 39 and 41. Since there is no stand off piece or parting line to establish a precision air gap separation, the air gaps 53 to 56 are established by inserting low permeability shim material in the air gap. There is an advantage in the cost of manufacturing the center horizontal pole 40 as a flat rectangular pole piece and then manufacturing two identical open U-shaped upper and lower pole pieces that are connected together with the center pole piece in final assembly.

Having explained three embodiments which facilitate different modes of manufacture and assembly, it will be understood that different core materials may be more easily machined and shaped using more than one machining method so that any combination of air gap, standoffs and precision shim material explained above may be employed without departing from the present invention.

The present invention structure includes a short turn 33 which was heretofore known to increase frequency response, however, until made and tested it was not known to what effect the change in impedance due to placing air gaps in the flux path of the coils reaction flux would have on frequency response.

Figure 10:
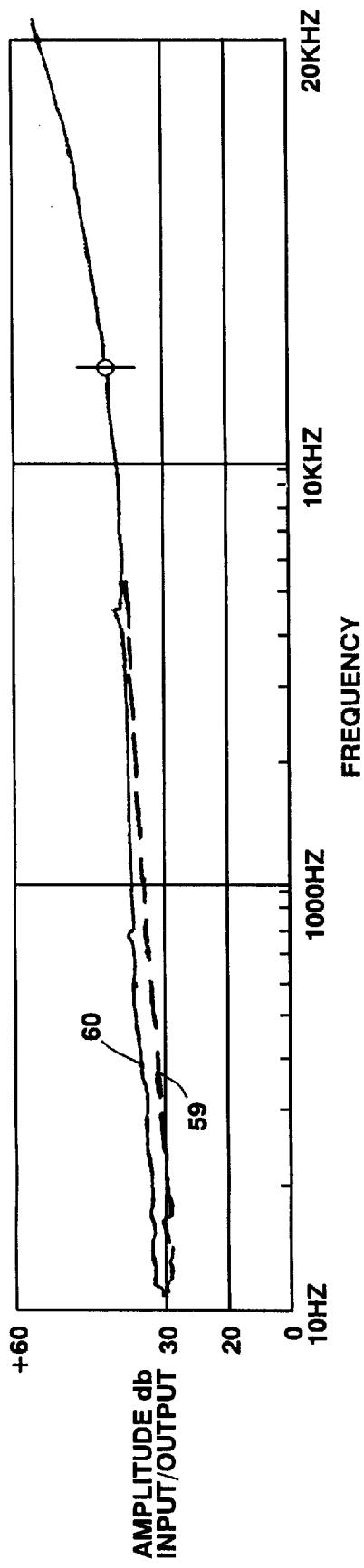
FIG. 10 is a plot showing two sets of waveforms each having a logarithmic X ordinate in frequency response versus (1) phase shift in degrees and (2) versus the amplitude ratio of input/output comparing the new and old motor systems.
Figure 10:
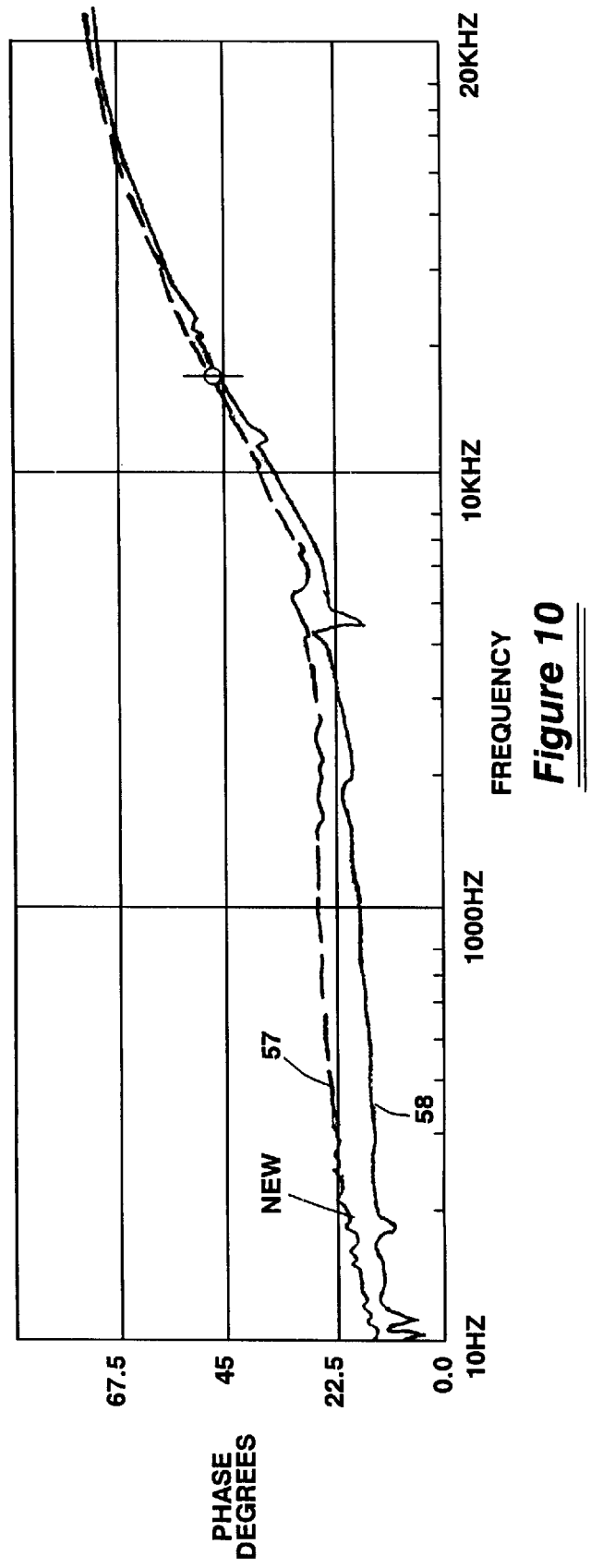

Refer now to FIG. 10 showing two sets of waveforms having an X ordinate plot in frequency response versus phase shift and the amplitude ratio of input versus output. Tests performed show that the load impedance sensed by the load current was the same for a prior art motor and the present invention motor. Waveform 57 shows the phase of current in the coil 14 of stator 43 and waveform 58 shows the phase in a similar coil 14 in a prior art stator 37. Similarly, waveforms 59 and 60 show the amplitude input-output ratio of the new and old motor systems respectively.

It can be concluded from these tests that there is little or no effect on the electrical characteristics of the two motors.

Having explained that the efficiency and speed of response of the present invention motor is substantially enhanced with little or no change in impedance it will be understood that the cost of the improvement over the prior art motor is virtually free. Thus, the improvement of the motor shown in our U.S. Pat. No. 4,808,892 remains undiscovered for over a decade while the essential demand remained unfilled.

The slight change in structure has produced a synergistic effect and a more desirable product without associated cost, thus, the invention satisfies the requirements of patentable novelty.

I claim:

1. A bi-directional linear motor of the type having a force coil capable of exerting a drive force in an X or Y direction while being moved in a transverse direction, comprising:

a stator comprising a plurality of high magnetic permeability pole pieces formed as a closed frame having three horizontal pole pieces and two vertical end pieces, said force coil having a resistance R and comprising a plurality of turns surrounding a center pole piece of said three horizontal pole pieces, permanent magnet means mounted in a flux field path on said pole piece for generating a static symmetrical flux field pattern in said stator, air gap means in at least one of said pole pieces for increasing load path inductance without increasing flux density, and said air gap means creating a low magnetic permeability narrow parallel space in the reaction flux field path generated by a force current applied through said force coil for increasing the reaction force on said force coil per unit of applied force current and the time constant $T = Z_L/R$.

2. A bi-directional linear motor as set forth in claim 1 wherein said air gap means comprises at least an air gap in said center pole.

3. A bi-directional linear motor as set forth in claim 1 wherein said air gap means comprise at least more than one air gaps in at least more than one of said three horizontal pole pieces.

4. A bi-directional linear motor as set forth in claim 1 wherein said air gap means comprise a plurality of air gap in said vertical pole pieces.

5. A bi-directional linear motor as set forth in claim 1 wherein said air gap means comprise a plurality of air gaps symmetrically positioned in said pole pieces of said stator.

6. A bi-directional linear drive motor of the type employed to drive a load pattern at very high gravitational forces in an X or in a Y direction, comprising:

a permanent magnet stator core assembly comprising a plurality of permanent magnets mounted in a closed frame stator core for generating a balanced magnetic flux field through two vertical and three horizontal pole pieces of said stator core assembly, a force coil having a resistance R suspended in said balance magnetic flux field of said stator core assembly for generating a reaction flux field in response to an applied drive current, said reaction force field causing an unbalanced magnetic flux field in said stator core assembly, and air gap means having a narrow parallel gap in at least one of said pole pieces placed in a series path of said reaction force field for increasing the inductance $Z_L$ of said reaction field and the time constant and for reducing said unbalanced magnetic flux field and the response time.

7. A bi-directional motor as set forth in claim 6 wherein said air gap means comprise a single air gap in a center pole piece of said three horizontal pole pieces.

8. A bi-directional motor as set forth in claim 6 wherein said air gap means further includes low permeability material inserted as a filler in the air gap of said air gap means.

9. A bi-directional motor as set forth in claim 6 wherein said air gap means further includes shim material having a predetermined thickness which defines the space in said air gap.

10. A bi-directional motor as set forth in claim 6 wherein said air gap means comprise a space up to seven millimeters wide.

11. A bi-directional motor as set forth in claim 10 wherein said air gap means comprise a space of three to seven millimeters.

12. A bi-directional motor as set forth in claim 6 wherein said air gap means comprise a space that is up to twelve percent of the width of said force coil.

13. A method of increasing the force on a force coil of bi-directional linear motor without increasing the drive current in the force coil, comprising the steps of:

providing a permanent magnet stator core assembly comprising a plurality of pole pieces and a plurality of permanent magnets mounted in a closed frame stator core, generating a balanced symmetrical flux field in said stator core with said permanent magnets, mounting said force coil in said symmetrical flux field, applying a predetermined drive current to said force coil, generating a reaction flux field in said stator core which creates an unbalanced flux field in said stator core as a result of application of said drive current, and providing a narrow parallel air gap in at least one of said pole pieces through which said reaction flux field passes and which increases the inductive load Z of the force coil, wherein the force on said force coil resulting from the application of said predetermined drive current is increased.

14. The method as set forth in claim 13 wherein the step of providing an air gap in at least one of said pole pieces comprises cutting an air gap in a pole piece.

15. The method as set forth in claim 13 wherein the step of providing an air gap in at least one of said pole pieces comprises placing a spacing shim in one or more of said pole pieces.

16. The method as set forth in claim 13 wherein the step of providing an air gap in at least one of said pole pieces further includes creating a space in the air gap which ranges between three and seven millimeters.

17. A bi-directional linear motor as set forth in claim 2 which further includes a shorted turn on said center pole bisected by said air gap means.

\* \* \* \* \*